Patented Aug. 15, 1933

1,922,207

UNITED STATES PATENT OFFICE 1,922,207

2-CYANO-5-NITRO DIPHENYL

William S. Jones and William Braker, Brooklyn, N. Y., assignors to E. R. Squibb & Sons, Brooklyn, N. Y., a Corporation of New York No Drawing. Application February 15, 1932
Serial No. 593,192

1 Claim. (Cl. 260—108)

This invention relates to 2-cyano-5-nitro diphenyl. This has proved valuable particularly as an intermediate in the production of therapeutically active compounds. Our copending application, Serial No. 632,789 filed September 12, 1932, refers to such a therapeutically active derivative.

The new compound is advantageously prepared by diazotizing 2-amino-5-nitro diphenyl and then treating the diazotized product with a cyanide at an elevated temperature. The 2-amino-5-nitro diphenyl which is used as the starting material may be prepared by the method given in the Journal of the Chemical Society, volume 2, 1928, page 2774, or preferably by hydrolysis of 5-nitro-2-para-toluene sulfonamido diphenyl.

25.0 grams of 2-amino-5-nitro diphenyl is dissolved in 24.0 cc. of hydrochloric acid (concentrated) contained in 75 cc. of water. The solution is diazotized with 10.44 grams of sodium nitrite; the excess nitrite is destroyed by the addition of solid urea. This diazonium solution is added over a period of about one-half hour to a solution of potassium copper cyanide kept at 90° C. This cyanide solution may be prepared by dissolving 50.0 grams of crystalline copper sulfate and 56.0 grams of potassium cyanide in sufficient water to bring the total to 300 cc. The reaction mixture is heated for six hours during which a crop of brown crystals form. These crystals are filtered and washed free of inorganic matter. The nitrile, viz. 2-cyano-5-nitro diphenyl thus obtained is recrystallized from alcohol. This compound has been found to have a melting point of 132–134° C.

We claim:

2-cyano-5-nitro diphenyl.

WILLIAM S. JONES.
WILLIAM BRAKER.